(12) United States Patent
Lamontagne

(10) Patent No.: US 7,647,202 B2
(45) Date of Patent: Jan. 12, 2010

(54) METHOD FOR EXCEPTION-BASED NOTIFICATION OF THE CONDITION OF AN APPARATUS

(75) Inventor: Donald R. Lamontagne, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 568 days.

(21) Appl. No.: 11/481,975

(22) Filed: Jul. 5, 2006

(65) Prior Publication Data

US 2009/0009351 A1    Jan. 8, 2009

(51) Int. Cl.
*G06F 19/00* (2006.01)
*G06F 17/40* (2006.01)

(52) U.S. Cl. .................. 702/182; 340/3.1; 340/3.43; 340/500; 340/540; 340/679; 340/825.36; 340/870.01; 340/870.07; 340/870.16; 702/33; 702/34; 702/183; 702/184; 702/185; 702/187; 702/188

(58) Field of Classification Search .................. 340/3.1, 340/3.43, 500, 540, 635, 679, 680, 825, 825.36, 340/870.01, 870.07, 870.16; 702/1, 33, 34, 702/35, 127, 182, 183, 184, 185, 186, 187, 702/188, 189
See application file for complete search history.

(56) References Cited

U.S. PATENT DOCUMENTS

| | | | | |
|---|---|---|---|---|
| 2,883,255 | A * | 4/1959 | Anderson | 346/34 |
| 3,304,441 | A * | 2/1967 | Pelt | 327/509 |
| 5,959,529 | A * | 9/1999 | Kail, IV | 340/539.12 |
| 6,225,901 | B1 * | 5/2001 | Kail, IV | 340/539.11 |
| 6,391,096 | B1 | 5/2002 | Waters et al. | |
| 6,940,403 | B2 * | 9/2005 | Kail, IV | 340/539.12 |
| 7,399,277 | B2 * | 7/2008 | Saidara et al. | 600/300 |
| 7,539,731 | B2 * | 5/2009 | Yamamoto et al. | 709/206 |
| 2002/0177910 | A1 * | 11/2002 | Quarterman et al. | 700/28 |
| 2003/0115019 | A1 | 6/2003 | Doddek et al. | |
| 2003/0122677 | A1 * | 7/2003 | Kail, IV | 340/573.1 |
| 2004/0205142 | A1 * | 10/2004 | Bahr | 709/207 |
| 2005/0013291 | A1 * | 1/2005 | Yamamoto et al. | 370/352 |

(Continued)

OTHER PUBLICATIONS

Bob Augenstein, "Outside Experts Monitor Status of Key Transformers", Transmission & Distribution World, May 2003, Primedia Bus. Magazines & Media Inc.

(Continued)

*Primary Examiner*—Edward R Cosimano
(74) *Attorney, Agent, or Firm*—Meschkow & Gresham, PLC

(57) ABSTRACT

A system (30) includes an analysis engine (34) and a notification engine (38) for selective notification of a condition (72) of an apparatus (26) monitored by a monitoring device (28). A method executed by the system (30) receives (116) data elements (58) from the monitoring device (28), processes (118) the data elements (58) to detect the condition (72) of the apparatus (26), and determines that the condition (72) defines an exception (74) to a normal condition (70) of the apparatus (26). A first notice (60) of the condition (72) is conveyed (146) to a responsible party (59) at a first instance of determination of the exception (74), and conveyance of a second notice (60) is prevented (140) at a second, subsequent, instance of determination of the exception (74). In addition, communication of the normal condition (70) of the apparatus (26) is prevented.

26 Claims, 8 Drawing Sheets

U.S. PATENT DOCUMENTS

2005/0038332 A1* 2/2005 Saidara et al. .............. 600/347
2008/0255438 A1* 10/2008 Saidara et al. .............. 600/365
2009/0132071 A1* 5/2009 Phillip ......................... 700/91

OTHER PUBLICATIONS

Yann-Chang Huang, "A New Intelligent Approach to Fault Detection of Electric Power Transformers", approx. 2000.

Michel Duval, "A Review of Faults Detectable by Gas-in-Oil Analysis in Transformers", IEEE Electrical Insulation Magazine, May/Jun. 2002, vol. 18, No. 3.

Michel Duval & Alfonso Depablo, "Interpretation of Gas-in-oil Analysis Using New IEC Publication 60599 and IEC TC 10 Databases", IEEE, Mar./Apr. 2001, vol. 17, No. 2.

Vladimiro Miranda & Adriana Rosa Garcez Castro, "Improving the IEC Table for Transformer Failure Diagnosis with Knowledge Extraction From Neural Networks", IEEE, Oct. 5, vol.

Zhenyuan Wang, "Artificial Intelligence Applications in the Diagnosis of Power Transformer Incipient Faults", Aug. 2000, Blacksburg, VA.

Transformers Committee, "IEEE Guide for the Interpretation of Gases Generated in Oil-Immersed Transformers", Institute of Electrical & Electronics Engineers, Inc., NY, Jul. 1992.

"Mineral Oil-Impregnated Electrical Equipment in Service", Norme Internationale, CEI IEC 60599 2nd Edition 99-03, IEC 1999, Switzerland.

General Electrotechnical Engineering Standards Committee, "The Interpretation of the Analysis of Gases in Transformers and Other Oil-Filled Electrical Equipment in Service" 99.

* cited by examiner

FIG. 2

| TRANSFORMER ID | H₂ | O₂ | CO | CO₂ | CH₄ | C₂H₂ | C₂H₄ | C₂H₆ |
|---|---|---|---|---|---|---|---|---|
| TA01 | 10 | 750 | 55 | 400 | 25 | 0 | 2 | 10 |

FIG. 3

| TRANSFORMER ID | H₂ | O₂ | CO | CO₂ | CH₄ | C₂H₂ | C₂H₄ | C₂H₆ |
|---|---|---|---|---|---|---|---|---|
| TA01 | 35 | 900 | 310 | 1100 | 6 | 0 | 0 | 0 |

FIG. 4

| TRANSFORMER ID: TA01 ||||
|---|---|---|---|
| FAULT CONDITION || | SEVERITY LEVEL |
| TYPE | LOCATION || |
| OVERHEATING | WINDINGS || 4 |

| H₂ | O₂ | CO | CO₂ | CH₄ | C₂H₂ | C₂H₄ | C₂H₆ |
|---|---|---|---|---|---|---|---|
| 35 | 900 | 310 | 1100 | 6 | 0 | 0 | 0 |

FIG. 5

| FAULT CONDITION | | SEVERITY LEVEL | RESPONSIBLE PARTY | BACKUP |
|---|---|---|---|---|
| TYPE | LOCATION | | | |
| OVERHEATING | LOAD TAP CHANGER | 1,2 | OPERATIONS | OPS. LEAD |
| | | 1,2,3,4 | MID-MANAGEMENT | OPS. |
| | | 1,2,3,4,5 | MAINTENANCE | MID-MAN. |
| | TANK | 1,2 | OPERATIONS | ... |
| | | 1,2,3,4 | MID-MANAGEMENT | |
| | | 1,2,3,4,5 | MAINTENANCE | |
| | LEADS | 1,2 | OPERATIONS | |
| | | 1,2,3,4 | MID-MANAGEMENT | |
| | | 1,2,3,4,5 | MAINTENANCE | |
| | WINDING | 1,2 <br> 1,2,3,4 <br> 1,2,3,4,5 | ... | |
| | OTHER | ⋮ | ... | |
| OVERHEATING OIL | LOAD TAP CHANGER, TANK, LEADS, WINDING, OTHER | ⋮ | ... <br> ... <br> ... | |
| LOW ENERGY DISCHARGE | ⋮ | ⋮ | | |
| ARCING | | | | |
| CELLULOSE DEGRADATION | | | | |
| ALL | ALL | 6 | MAINT | |

FIG. 6

| NOTICE ID | EXCEPTION | WHEN SENT | ACK. RCV'D? | RCV'D FROM 84 | WHEN DISPOSITIONED | DISPOSITION |
|---|---|---|---|---|---|---|
| NOTICE 1 | TA01/ OVERHEATING/ LEADS/5 | 4/1/06, 10:35 AM | Y | MAINT/ USER 001 | 4/1/06, 11:14 AM, USER 001 | CONTINUE NORMAL MONITORING |
| NOTICE 2 | TB03/LOW ENERGY DISCHARGE/ TANK/3 | 4/4/06, 1:42 PM | Y | MAINT/ USER 001 | 4/4/06, 2:18 PM, USER 001 | SCHEDULE OUTAGE FOR ELECTRICAL TESTING |
| NOTICE 3 | TA02/ARCING/TAP CHANGER/4 | 4/10/06, 6:35 AM | N | - | - | - |
| NOTICE 3 | TA02/ARCING/TAP CHANGER/4 | 4/10/06, 7:35 AM | N | - | - | - |
| NOTICE 3 | TA02/ARCING/TAP CHANGER/4 | 4/10/06, 8:35 AM | Y | MID-MAN/ USER 002 | 4/10/06, 8:42 AM, USER 004 | CONTINUE MONITORING, PERFORM MAINTENANCE AS SCHEDULED |
| NOTICE 4 | TB03/ARCING/ TANK/2 | 4/18/06, 9:53 PM | Y | MAINT/ USER 002 | 4/18/06, 9:53 PM, USER 002 | SHUTDOWN FOR REPAIR |
| ... | | | | | | |

METHOD FOR EXCEPTION-BASED NOTIFICATION OF THE CONDITION OF AN APPARATUS

TECHNICAL FIELD OF THE INVENTION

The present invention relates to the field of transformer management and fault monitoring systems. More specifically, the present invention relates to the selective notification of fault conditions in transformer systems.

BACKGROUND OF THE INVENTION

Electric power transmission is a process in the delivery of electricity to consumers. In general, the term "electric power transmission" refers to the bulk transfer of electrical power from place to place, for example, between a power plant and a substation near a populated area. Due to the large amount of power involved, electric transmission normally takes place at high voltage (110 kV or above). Transformers are used at the substations to step the voltage down to a lower voltage for distribution to commercial and residential users.

Major power transformers are filled with a fluid, typically of a mineral oil origin, that generally serves as a dielectric media, an insulator, and a heat transfer agent. During normal use this fluid typically undergoes a slow degradation to yield gases that collect in the oil. When there is an electrical fault within the transformer, these gases are generated more rapidly. Each of a number of fault conditions possible within a transformer generates certain key gases and a distribution pattern of these gases. Thus, the character of the fault condition giving rise to the gases can be ascertained by determining the various gases present in the transformer fluid and their amounts.

Dissolved gas analysis (DGA) is a widely used predictive maintenance technique for monitoring the collection and rate of generation of gases in transformer fluid, in order to gauge the operation of transformers. An appropriate dissolved gas analysis schedule can be set up depending on the location of a transformer, the nature of its usage, and the criticality of the unit. In addition, when a fault condition is detected the sampling frequency may be increased to determine how rapidly the gases are being generated and thus how serious the problem might be so that proper action can be taken before the unit suffers additional damage. In addition, it is considered essential to maintain a history of each unit so that a determination can be made as to whether any gases are residual ones from a previous fault condition or are they due to a newly developing fault condition.

On-line dissolved gas analysis units can provide analysis of multiple gases, for example, hydrogen ($H_2$), oxygen ($O_2$), carbon monoxide (CO), carbon dioxide ($CO_2$), methane ($CH_4$), acetylene ($C_2H_2$), ethylene ($C_2H_4$), and ethane ($C_2H_6$). Samples may be taken periodically, for example, every four hours, from each transformer being monitored. This sample rate desirably increases to, for example, hourly if predefined thresholds for an individual gas, or if a rate of change for an individual gas, is reached. At a utility managing many transformers, this sample rate yields a plethora of data samples, each of which is to be analyzed.

Human nature and workload can cause otherwise responsible individuals to postpone analysis of a group of samples due to the repetitive nature of the samples from the on-line DGA monitoring units. The usefulness of an on-line monitoring system can thus be defeated when the enormous quantity of data is not examined in a timely manner. Consequently, the utility is typically faced with too little information for a variety of apparatuses because it cannot adequately collect and filter the data into manageable and useful information. Under these circumstances, certain conditions can go undetected until a catastrophic event occurs.

Utilities are interested in safely maximizing the use of their assets, minimizing customer costs by providing uninterrupted power delivery, and protecting the shareholders who have invested in the utility. Properly used, dissolved gas analysis can provide a powerful continuous monitoring tool in a transformer maintenance program. However, the effectiveness of dissolved gas analysis is limited by the ability to properly disseminate the results of the dissolved gas analysis. Thus, what is needed is a technique for the effective dissemination of dissolved gas analysis data.

SUMMARY OF THE INVENTION

Accordingly, it is an advantage of the present invention that a method and system are provided for selective notification of a condition of an apparatus.

It is another advantage of the present invention that a method and system are provided that provides notification only during a first instance of a detected fault condition, and refrains from notification of the same condition.

Another advantage of the present invention is that a method and system are provided that provides notification of a fault condition only to the responsible party or parties.

The above and other advantages of the present invention are carried out in one form by a method for selective notification of a condition of an apparatus monitored by a monitoring device. The method calls for receiving data elements from the monitoring device, processing the data elements to detect the condition of the apparatus, and determining that the condition defines an exception to a normal condition of the apparatus. A first notice of the condition is conveyed to a responsible party at a first instance of determination of the exception. Conveyance of a second notice at a second instance of determination of the exception is prevented, the second instance occurring subsequent to the first instance.

The above and other advantages of the present invention are carried out in another form by a system for selective notification of a condition of each of a plurality of apparatuses, each of the apparatuses being monitored by one of a plurality of monitoring devices. The system includes an analyzer configured for communication with each of the plurality of monitoring devices such that for each of the monitoring devices, the analyzer receives data elements from each monitoring device, processes the data elements to detect the condition of an associated one of the apparatuses, and determines that the condition defines one of a normal condition and an exception to the normal condition. The system further includes a notification engine in communication with the analyzer. The notification engine conveys a first notice of the condition to a responsible party at a first instance of determination of the exception. The notification engine prevents conveyance of a second notice of the condition at a second instance of determination of the exception, the second instance occurring subsequent to the first instance, and the notification engine prevents communication with the responsible party upon determination of the normal condition.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a diagram of a first exemplary packet of data elements produced by a monitoring device monitoring one of the apparatuses of FIG. 1;

FIG. 3 shows a diagram of a second exemplary packet of data elements produced by the monitoring device monitoring one of the apparatuses of FIG. 1;

FIG. 4 shows a diagram of a notice provided to a responsible party of an exception to a normal condition of one of the apparatuses of FIG. 1;

FIG. 5 shows a diagram of a contact list database of responsible parties associated with a plurality of exceptions possible at one of the apparatuses of FIG. 1;

FIG. 6 shows a diagram of an exception database maintained by a notification engine of the processing system of FIG. 1;

DETAILED DESCRIPTION OF THE PREFERRED EMBODIMENTS

The present invention entails an exception-based notification method and system for selectively notifying a responsible party of an exception, i.e., a fault condition and severity level, in an apparatus. The notification method and system are described in connection with monitoring of fault conditions in extra high voltage (EHV) transformers located at substations of an electric utility company. Monitoring is performed by dissolved gas analysis (DGA) units, one or more of the DGA units performing on-line monitoring of one each of the transformers. A notification engine in accordance with the present invention communicates a notice of an exception to the appropriate responsible party without inundating the responsible party and other parties with unnecessary and/or repetitive information. It should become readily apparent in the ensuing discussion that the present invention may be readily adapted to a variety of environments in which vast quantities of data are being collected and analyzed, and in which only selective notification of the analyzed data need be communicated to the appropriate individuals.

Figure 1:
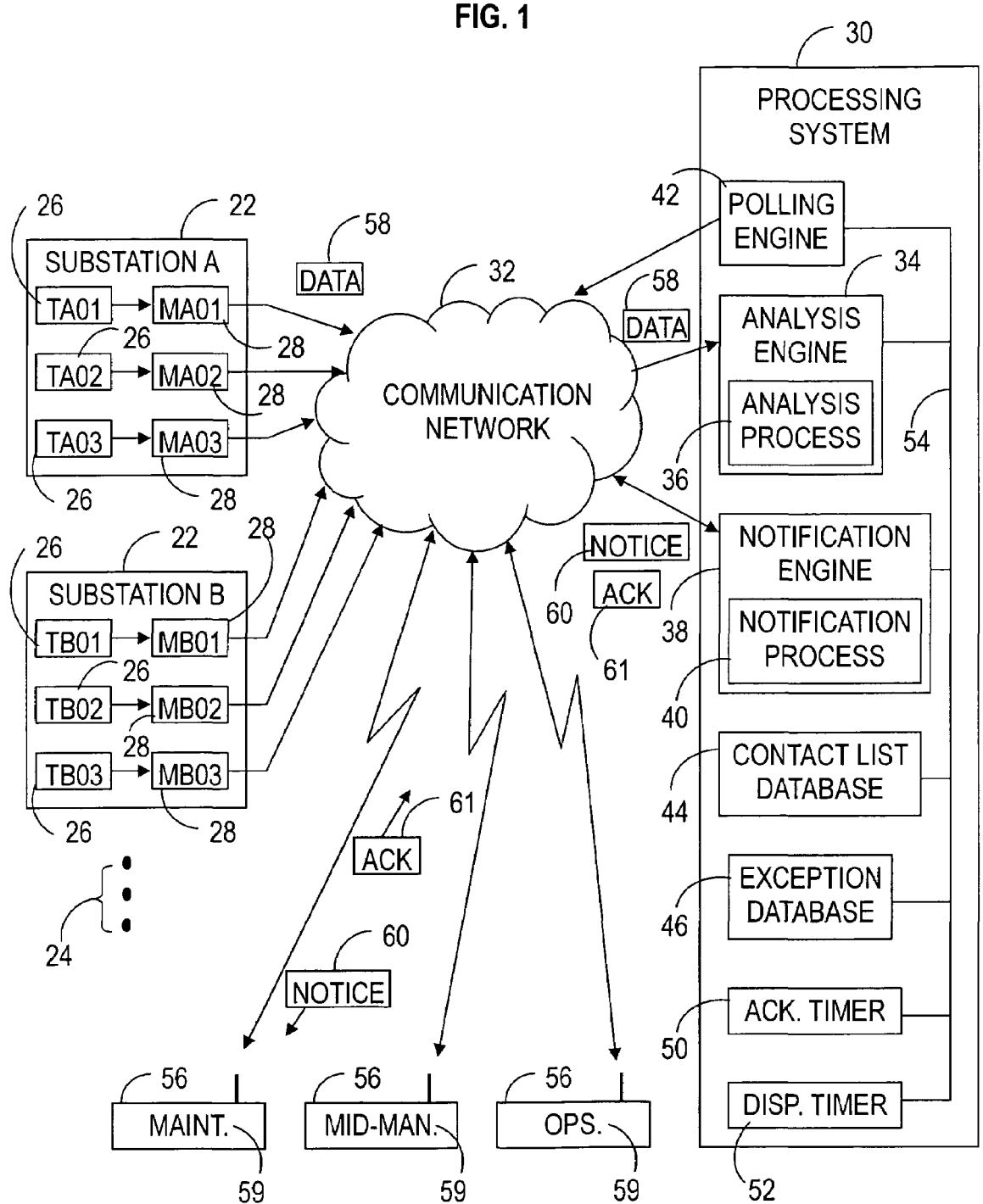
FIG. 1 shows a block diagram of a portion of an electric utility facility in which analysis of data elements and exception-based notification of fault conditions take place in accordance with a preferred embodiment of the present invention.

FIG. 1 shows a block diagram of a portion of an electric utility facility 20 in which analysis of data elements and exception-based notification of fault conditions take place in accordance with a preferred embodiment of the present invention. Facility 20 includes a plurality of substations 22, of which only two are shown. Additional substations 22 are represented by ellipsis 24. A plurality of apparatuses, in the form of transformers 26, is located at each of substations 22. Only three transformers 26 are shown at each of substations 22 for simplicity of illustration. However, it should be understood that each of substations 22 can include any number of transformers 26, as known to those skilled in the art.

Each of transformers 26 is monitored by one or more of a plurality of dissolved gas analyzer (DGA) units 28. DGA units 28 monitor transformer fluid, typically of a mineral oil origin. DGA units 28 monitor, for example, eight gases that are a product of the degradation of the mineral oil-based transformer fluid. These eight gases can include hydrogen ($H_2$), oxygen ($O_2$), carbon monoxide ($CO$), carbon dioxide ($CO_2$), methane ($CH_4$), acetylene ($C_2H_2$), ethylene ($C_2H_4$), and ethane ($C_2H_6$).

Facility 20 further includes a processing system 30 in communication with DGA units 28 via a communication network 32. In a preferred embodiment, processing system 30 may be located at a energy control center (not shown) operated by the electric utility facility 20. However, processing system 30 may alternatively be outsourced to a contracted third party monitoring facility.

Processing system 30 includes a first processing unit, in the form of an analysis engine 34 that executes an analysis process 36. Processing system 30 further includes a second processing unit, in the form of a notification engine 38 that executes a notification process 40, and an optional polling engine 42. Those skilled in the art will recognize that analysis engine 34, notification engine 38, and polling engine 42 need not be distinct physical units, but may instead be realized on a single processing medium. The specific configuration of processing system 30 depends, at least in part, on the complexity of facility 20, the number of DGA units 28 providing data to processing system 30, and the amount of data being processed.

Notification engine 38 is in communication with memory elements having stored therein a contact list database 44 and an exception database 46. Those skilled in the art of database configuration will recognize that contact list database 44 and exception database 46 can take on a great variety of forms. An acknowledgement (ACK.) timer 50 and a disposition (DISP.) timer 52 are also in communication with notification engine 38. Communication between the various elements of processing system 30 is achieved via a bus structure 54.

Facility 20 further includes notification devices 56. Notification devices 56 may be conventional handheld communications devices, such as pagers, cellular phones, personal digital assistants, or a combination thereof. Alternatively, notification devices 56 may be desktop computers or any other means for producing an electronic message to the users of notification devices 56. Notification devices 56 are preferably in communication with processing system 30 via communication network 32. Communication network 32 may communicate via conventional wireless and/or wireline techniques well known to those skilled in the art.

Each of notification devices 56 is assigned to, or associated with, particular responsible parties 59. In this illustration, responsible parties 59 include a maintenance team, a middle management team, and an operations team. The term "responsible party" used herein refers to one or more individuals that are responsible for transformers 26 at particular substations 22, are most knowledgeable of the corrective measures needed for particular fault conditions, and/or have an appropriate level of authority to make decisions regarding transformers 26. Responsible parties 59 will be discussed in greater detail in connection with FIG. 5.

In general, DGA analyzers 28 sample fluid within transformers 26 and monitor for dissolved gases in the sampled fluid. Samples may nominally be taken every four hours. However, the sample rate may increase to hourly if predefined thresholds for an individual gas, or if a rate of change for an individual gas, is reached. Dissolved gas monitoring at DGA units 28 entails measurement of a quantity for each of a number of gases within transformer fluid. These measurements are subsequently communicated as data elements 58 to analysis engine 34 via communication network 32. Communication of data elements 58 from DGA units 28 may take place automatically and/or in response to a polling signal communicated from polling engine 42. Alternatively, data elements 58 can be taken manually. These manual measurements can be manually input into processing system 30 per conventional data entry methodology. Data elements 58 are analyzed by analysis engine 34, and the results of the analysis are provided from notification engine 38 to one or more notification devices 56 assigned to one or more responsible parties 59 in the form of a notice 60. Once received, a primary responsible party (discussed below) sends an acknowledgement (ACK.) 61 of receipt of notice 60. The details of notification and acknowledgement, in accordance with the present invention, are provided in connection with FIGS. 8A-8B and 9.

Referring to FIGS. 2 and 3, FIG. 2 shows a diagram of a first exemplary packet 62 of data elements 58 produced by one of DGA units 28 (FIG. 1) monitoring one of transformers 26 (FIG. 1), and FIG. 3 shows a diagram of a second exemplary packet 63 of data elements 58 produced by DGA unit 28 monitoring transformer 26. Each of packets 62 and 63 desirably includes a transformer identifier 64, shown herein as "TA01" identifying one of transformers 28. Each of packets 62 and 63 further includes data elements 58 as values 66 for each of a number of gases 68 that are being monitored by DGA unit 28. Additional information, not shown herein, may be included such as time/date collected, rate of change of each gas 68, other gases 68 not listed therein, and so forth.

First and second packets 62 and 63 are illustrated herein to portray the information that may be provided from DGA units 28 (FIG. 1) to processing system 30 (FIG. 1) for analysis and subsequent selective notification in accordance with the present invention. The particular configuration of data elements 58 and first and second packets 62 and 63, respectively, for transmission can take a variety of forms and transmission can be accomplished via a variety of techniques known to those skilled in the art.

FIG. 2 generally shows first packet 62 representing a normal condition 70 in which transformer 28, identified by "TA01" is behaving normally. Normal condition 70 may be determined when values 66 for each of gases 68 fall within pre-established limits that define normal condition 70, such as a "Condition 1" level. These pre-established limits may be provided in an industry recognized standard such as the IEEE Std C57.104-1991 "IEEE Guide for the Interpretation of Gases Generated in Oil-Immersed Transformers"

In contrast, FIG. 3 generally shows second packet 63 representing an abnormal condition 72, in which transformer 28, identified by "TA01" is behaving abnormally. Abnormal condition 72 may be determined when some or all values 66 for gases 68 have risen to more critical condition levels. In this example, carbon monoxide (CO) level has risen to a value that is above normal desired limits. Consequently, the term "abnormal condition 72" is utilized herein to refer to a situation as monitored by DGA units 28 (FIG. 1) in which values 66 for gases 68 are not within normal limits.

FIG. 4 shows a diagram of notice 60 provided to one or more of responsible parties 59 (FIG. 1) of an exception 74 to normal condition 70 (FIG. 2) of one of transformers 26 (FIG. 1). As mentioned briefly above, data elements 58 herein are values 66 for gases 68 sampled at DGA units 28 (FIG. 1). These values 66 for gases 68 are analyzed by analysis engine 34 to reveal an exception 74, i.e., the specific abnormal condition 72, currently being experienced at the one of transformers 26. Notice 60 is utilized herein to communicate exception 74.

Notice 60 is illustrated herein to portray the information regarding exception 74 that may be provided from notification engine 38 (FIG. 1) to one or more of responsible parties 59 in accordance with the present invention. The particular configuration of notice 60 can take a variety of forms known to those skilled in the art.

Notice 60 includes transformer identifier 64. Notice 60 further communicates exception 74, and may optionally include values 66 for gases 68. Exception 74 defines a fault condition 76 and a severity level 78 at one of transformers 26. Fault condition 76 identifies a fault type 80 and a fault location 82. Thus, in its entirety, exception 74 provides responsible parties 59 with a high level of detail regarding an abnormality within one of transformers 26, i.e., fault type 80, fault location 82, and severity level 78 of the particular fault type 80 at the particular fault location 82.

FIG. 5 shows a diagram of contact list database 44 of responsible parties 59 associated with a plurality exceptions 74 (combination of fault condition 76 and severity level 78) possible at transformers 26 (FIG. 1). Contact list database 44 is illustrated herein to portray the association between exceptions 74 and responsible parties 59 in accordance with the present invention. Those skilled in the art of database configuration and management will recognize that contact list database 44 can take a variety of forms.

Contact list database 44 includes one or more of responsible parties 59 associated with each combination of fault type 80, fault location 82, and severity level 78. Contact list database 44 provides notification engine 38 (FIG. 1) with the information needed to convey notice 60 (FIG. 1) to the appropriate one or more of responsible parties 59. Only a portion of contact list database 44 is shown herein for brevity, with ellipses representing additional information retained in contact list database 44.

In this exemplary scenario, five fault types 80 can be recognized through analysis of values 66 (FIG. 2) of gases 68 (FIG. 2). The five fault types 80 include overheating, overheating oil, low energy discharge, arcing, and cellulose degradation. In addition, five fault locations 82 can be recognized through analysis of values 66 of gases 68. The five fault locations 82 include load tap changer, tank (including core laminations and assembly bolts), leads (between coils, windings, and bushings, etc.), winding, or other (such as, static shielding, cooling system, etc.). In this exemplary scenario, six severity levels 78 can be recognized. The six severity levels 78 range from one (high) to six (normal). A severity level 78 of "6" for any of fault types 80 and fault locations 82 indicates normal condition 70, as represented by an entry 83. Consequently, there are one hundred twenty five possible exceptions 74 exemplified herein.

Responsible parties 59 are those individuals who need to be made aware of exception 74 and/or normal condition 70. In this example, three notification levels of responsible parties 59 are associated with particular exceptions 74. These three notification levels of responsible parties 59 include a maintenance team 84, a middle-management team 86, and a operations team 88. Various other teams, i.e., responsible parties 59, may be associated with particular exceptions 74 depending upon the size and complexity of electric utility facility 20 (FIG. 1), the overall size of the maintenance and operations organization, the particular fault conditions 76, and so forth. For example, there may be different individuals that form maintenance, mid-management, and operations teams for differing fault types 80, fault locations 82, and/or severity levels 78 for these differing fault types 80 and fault locations 82.

Notification, however, does not necessarily require response by each of responsible parties 59 that they were duly notified. Rather, response and disposition of exception 74 may be the direct responsibility of a particular one of responsible parties 59 in accordance with facility 20 (FIG. 1) policies and procedures with other responsible parties 59 being simply aware of exception 74.

Notification levels of responsible parties 59 within contact list database 44 vary as severity level 78 intensifies. In a preferred embodiment, this variance relates to an organizational chain of authority within electric utility facility 20 (FIG. 1). For example, when any of fault conditions 76 are at severity level 78 of "5" or "6", only maintenance team 84 requires notification of exception 74 and selective notification of normal condition 70 (discussed below). However, when any of fault conditions 76 are at severity level 78 of "4" or "3" (i.e., indicating fault condition 76 is of medium seriousness), both maintenance team 84 and mid-management team 86 require notification. When any of fault conditions 76 are at severity level 78 of "2" or "1" (i.e., indicating fault condition 76 has become very serious), all of maintenance team 84, mid-management team 86, and operations team 88 require notification. Thus, organizational awareness increases as the seriousness of fault condition 76 increases.

Contact list database 44 can further include backup responsible parties 90. In general, notification engine 38 (FIG. 1) is capable of sending notice 60 to backup responsible parties 90 if notice 60 is not responded to via acknowledgment 61 (FIG. 1) by responsible party 90. Through the utilization of backup responsible parties 90, redundancy may be provided so that fault condition 76 is unlikely to go unnoticed and unresolved.

Although five fault types 80 and five fault locations 82 are discussed in connection with contact list database 44, one skilled in the art will recognize that there could be more or less than five fault types 80 and, similarly, more or less than five fault locations 82 identified. In addition, although only six severity levels 78 are delineated herein, one skilled in the art will recognize that there could more or less than six severity levels identified.

FIG. 6 shows a diagram of exception database 46 maintained by notification engine 38 (FIG. 1) of processing system 30 (FIG. 1). Exception database 46 is shown in a simplified format for illustrative purposes. Those skilled in the art of database configuration and management will recognize that exception database 46 can assume a variety of configurations.

Exception database 46 includes an acknowledgement section 92 and a disposition section 94. In general, when notice 60 is sent to one or more of responsible parties 59 (FIG. 1), notification engine 38 awaits acknowledgement 61 (FIG. 1) from the one of responsible parties 59 that is required through facility 20 policies and procedures to respond to and affect disposition of exception 74 (FIG. 4) specified in notice 60. In this particular example, although responsible parties 59 at more than one notification level may receive notice 60 in accordance with contact list database 44 (FIG. 5), maintenance team 84 (FIG. 5) is required to dispatch acknowledgement 61.

Accordingly, acknowledgement 61 indicates that one or more individuals from maintenance team 84 has received notice 60. Acknowledgement 61 may be in the form of a conventional return receipt to notice 60 sent in accordance with an e-mail protocol, or some other similar messaging back to notification engine 38 that responsible party 59 is acknowledging receipt of notice 60. Alternatively, acknowledgement 61 may be in the form of a data entry by a member of maintenance team 84 into exception database 46. This acknowledgement, or lack thereof, is saved in acknowledgement section 92. Following acknowledgement of receipt of notice 60 from maintenance team 84, notification engine 38 (FIG. 1) awaits disposition of exception 74 (FIG. 4) by maintenance team 84. That is, maintenance team 84 is responsible for dealing conclusively with exception 74, and that conclusion or disposition is retained in disposition section 94.

Exception database 46 generally includes a notice identifier field 96 for storage of an identifier 98 related to a particular notice 60 and an exception identification field 100 for storage of information relating to the particular one of exceptions 74. Information relating to the particular one of exceptions 74 can include a transformer identifier 101 (ex., TA01), fault type 80 (ex., overheating), fault location 82 (ex., leads), and severity level 78 (ex., 5).

Acknowledgement section 92 includes a date/time field 102 for storage of a date and time 104 at which notice 60 was sent, an acknowledgement field 106 for indicating whether acknowledgement 61 (FIG. 1) of the receipt of notice 60 (FIG. 1) was received at notification engine 38, and an acknowledging recipient field 108 for storage of particular identification of the acknowledging one of responsible parties 59. In this case, an individual (ex., USER 001) from maintenance team 84 (MAINT.) acknowledges receipt of notice 60 (ex., NOTICE 1).

Disposition section 94 includes a date/time field 110 for storage of a date and time 112 at which exception 74 was dispositioned and for storage of responsible party 59 disposing exception 74 (ex., USER 001), and a disposition field 113 for retention of a disposition 114. Other information that may be retained in exception database 46 includes, for example, a schedule for testing and/or repair, a predictive maintenance schedule, and so forth. Examples of some dispositions 114 include "continue normal monitoring", "schedule outage for electrical testing", "continue monitoring, perform maintenance as scheduled", "shutdown for repair", and so forth.

The information provided in exception database 46 can be utilized to maintain a history of each of transformers 26 so that determinations can be made as to personnel responsiveness to exceptions 74, whether exception 74 is increasing or decreasing in severity from a previous exception 74, whether exception 74 is changing in terms of fault condition 76 (FIG. 3), and so forth. The information provided in exception database 46 can also be utilized to investigate persistence, or continuance, of exception 74 so that notification methodology (discussed below) can resend notice 60 to responsible party 59 and/or backup responsible parties 90 (FIG. 5) more frequently as severity level 78 indicates greater seriousness of exception 74. The population of exception database 46 and its use will be discussed in connection with FIG. 9.

Figure 7:
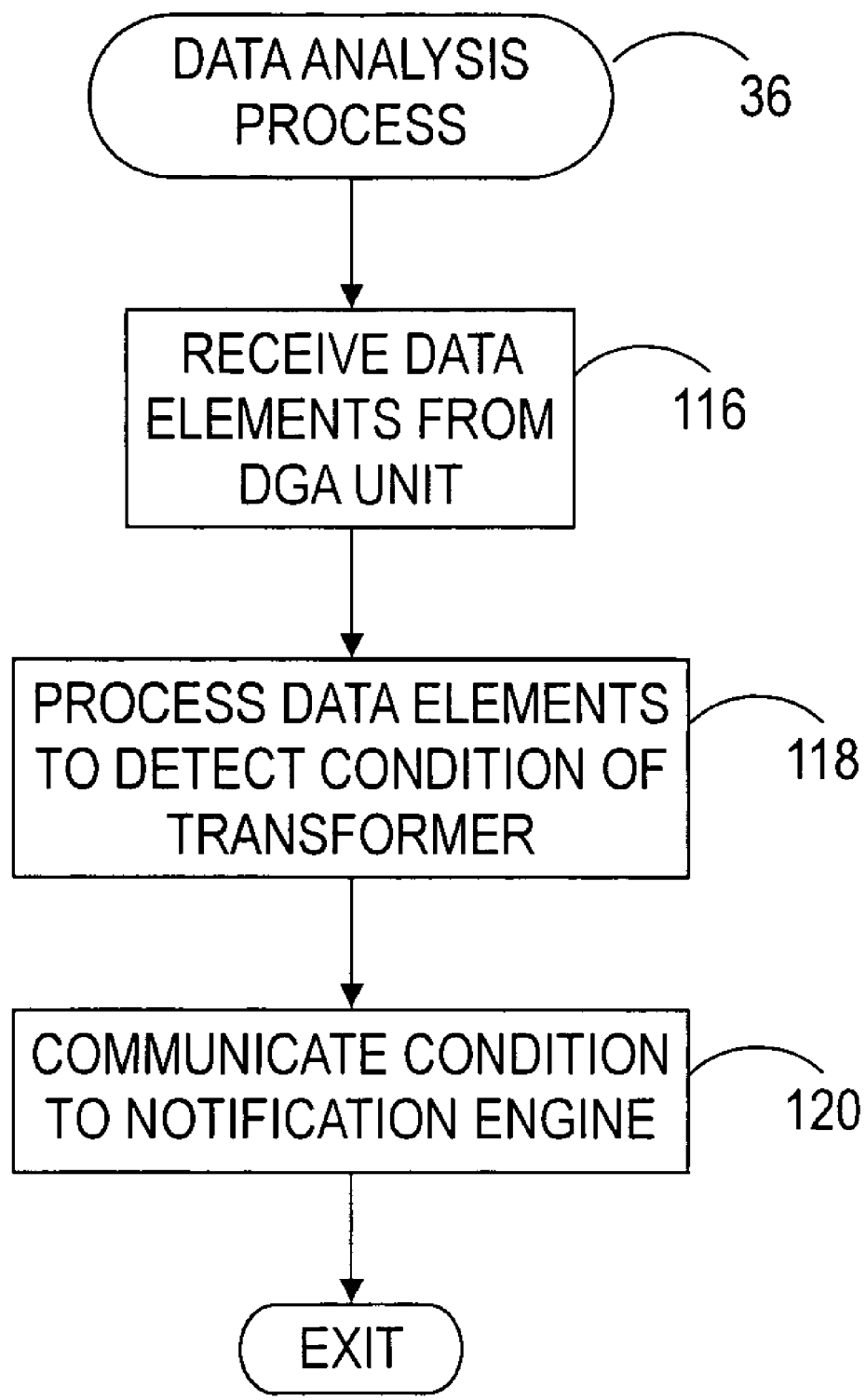
FIG. 7 shows a flowchart of a data analysis process executed by an analysis engine of the processing system of FIG. 1.

FIG. 7 shows a flowchart of analysis process 36 executed by analysis engine 34 (FIG. 1). Analysis process 36 is executed by analysis engine 34 to obtain results that can be used to determine whether transformers 26 are operating normally, i.e., normal condition 70 (FIG. 2), or abnormally, i.e., abnormal condition 72 (FIG. 3), and the specific one of exceptions 74 (FIG. 4) causing abnormal condition 72. Analysis process 36 will be described in connection with the receipt and analysis of one of first and second packets 62 and 63, respectively, (FIGS. 2-3) of data elements 58. However, it should be understood that through the execution of analysis process 36, analysis engine 34 can process data elements 58 from multiple transformers 26 (FIG. 1) on a nearly continuous basis as data elements 58 are received from DGA units 28 (FIG. 1).

Analysis process 36 begins with a task 116. At task 116, analysis engine 34 receives one of first and second packets 62 and 63 of data elements 58 from one of DGA units 28.

In response to the receipt of data elements 58 at task 116, a task 118 is performed. At task 118, analysis engine 34 processes data elements 58 to detect a condition, i.e., one of normal condition 70 (FIG. 2) and abnormal condition 72

(FIG. 3) caused by one of exceptions 74 (FIG. 4) for the particular one of transformers 26 monitored by DGA unit 28.

Any of a number of industry standard and evolving analysis techniques may be utilized by analysis engine 34 at task 118. Industry standard dissolved gas analysis methods include rule-based key gas analysis, Rogers ratio, Doernenburg ratio, CIGRE ratio, Duval method, and gas nomograph. These methods may be implemented independently or with fuzzy logic and a neural network to preserve information about the firmness of each diagnostic outcome. Another suitable evolving analysis technique is an analysis engine that includes an artificial neural network running in parallel with a rule based, expert system.

Regardless of the specific analysis method used, the objective of such a method is to provide a highly accurate algorithm that effectively distinguishes problem data elements 58 from unchanged or normal data elements 58, so as to create the possibility for an "exception-based" notification methodology. Moreover, the algorithm should be capable of accurately recognizing fault conditions 76, i.e., fault types 80 (FIG. 4) and fault locations 82 (FIG. 4), as well as be capable of characterizing a seriousness of each of fault conditions, i.e. severity level 78 (FIG. 4).

Ideally, execution of task 118 detects a condition of one of transformers 26, i.e. one of normal condition 70 (FIG. 2) and abnormal condition 72 (FIG. 3) exhibiting one of exceptions 74 (FIG. 5). When task 118 determines abnormal condition 72, analysis engine 34 further identifies fault type 80, fault location 82, and severity level 78 from one of exceptions 74.

In response to task 118, a task 120 is performed. At task 120, analysis engine 34 communicates the condition to notification engine 38. Following task 120, data analysis process 36 exits.

Figure 8A:
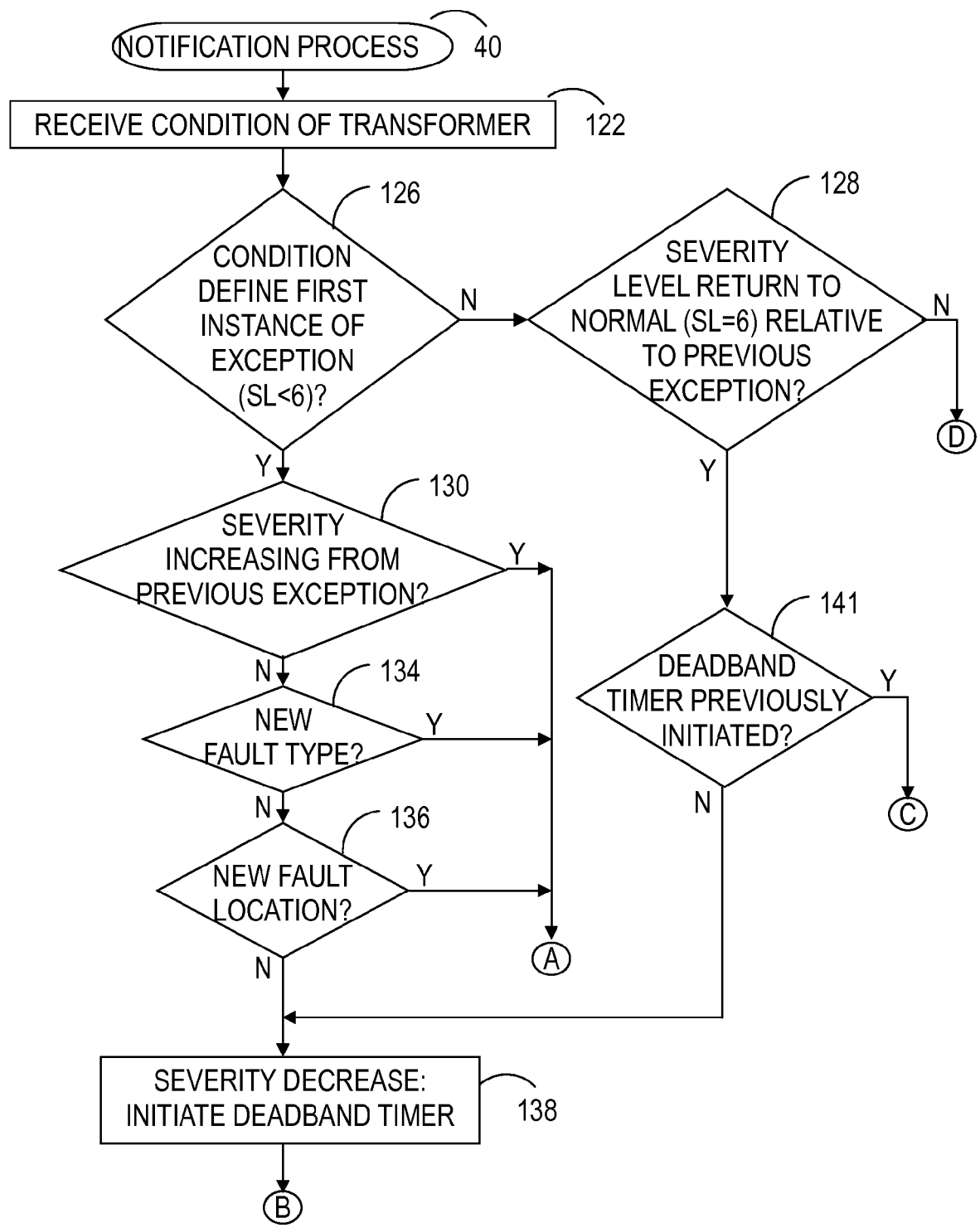
FIGS. 8A-8B show a flowchart of a notification process in accordance with the present invention.
Figure 8B:
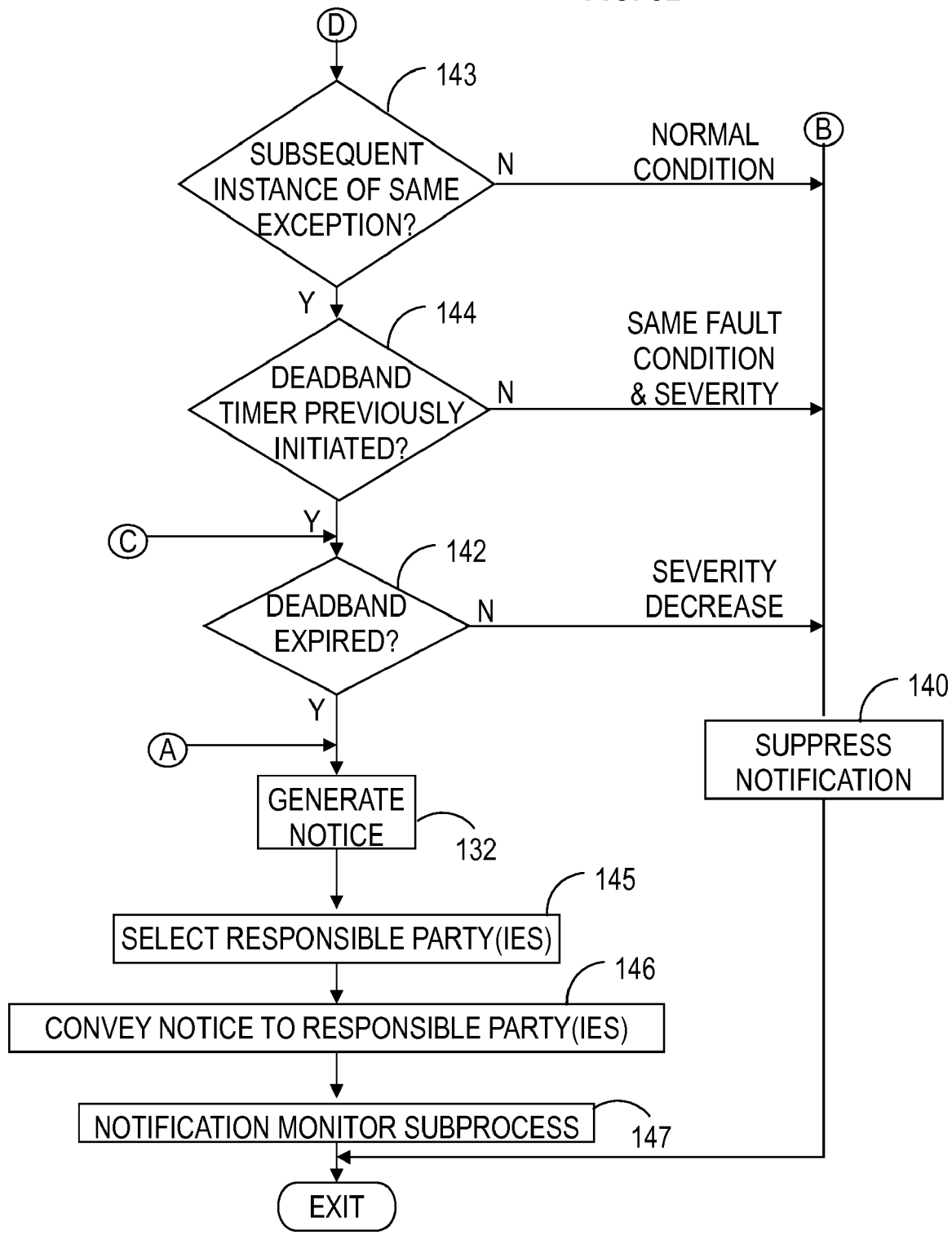

FIGS. 8A-8B show a flowchart of a notification process 40 in accordance with the present invention. Notification process 40 is performed by notification engine 38 (FIG. 1) to notify responsible parties 59 (FIG. 1) who need to be notified, typically only on a first instance of one of exceptions 74 (FIG. 5). Since DGA unit 28 (FIG. 1) is going to take another sample of data elements 58 (FIG. 1) in, for example, four or less hours, the likelihood that the sample is going to indicate the same exception 74 is high. Thus, notification engine 38 notifies only once for a given one of exceptions 74 unless issues arise in connection with acknowledgement of notification and/or in connection with the disposition of exception 74, discussed below. Notification process 40 is performed whether sampling of data elements 58 occurs on-line or through manual sampling and manual input of data elements into processing system 30 (FIG. 1).

In response to the execution of notification process 40 with manually entered data elements 58, a predictive maintenance schedule (not shown) may be adjusted, and maintenance information and recommendations may be generated. Such maintenance information could include quality of the oil, condition of the transformer (normal or fault condition), location and type of fault, and when the next sample should be taken. The predictive maintenance schedule, including a sampling interval, could be communicated to responsible party 59 (FIG. 1), to a computerized maintenance management system, and so forth. Thus, work planners and schedulers can then issue work orders to sample the particular one of transformers 26 (FIG. 1) at the next recommended interval.

Notification process 40 begins with a task 122. At task 122, notification engine 38 receives a condition of a particular one of transformers 26. That is, notification process 40 receives the results of analysis process 36 (FIG. 7).

In response to task 122, a query task 126 is performed. At query task 126, notification engine 38 determines whether the received condition defines a first instance of one of exceptions 74 (FIG. 4). In this example, notification engine 38 reviews the results received at task 122 to determine whether any possible fault conditions 76 (FIG. 5) exhibit severity level 78 (FIG. 5) of less then "6." It should be recalled that severity level 78 of six indicates normal condition 70 (FIG. 2) for any of the possible fault conditions 76. Whereas, severity level 78 of less than six, i.e., severity levels one through five indicate abnormal condition 72 (FIG. 3) for one of exceptions 74 (FIG. 5). Consequently, query task 126 searches for any fault conditions 76 (FIG. 5) for which a numerical value of severity level 78 is one, two, three, four, or five.

Execution of process 40 at query task 126 filters a number of situations in which notification to responsible party(ies) 59 (FIG. 5) may not be desired. These situations can include nominal operation of transformer 28, a subsequent instance of receipt of the one of exceptions 74, and a decrease of one of severity levels 78 prior to expiration of a deadband interval. Thus, the execution of query task 126 prevents the conveyance of repetitive notifications of the same one of exceptions 74 or unnecessary notifications of normal condition 70.

When query task 126 determines that the received condition does not define a first instance of one of exceptions 74 (FIG. 4), notification process 40 proceeds to a query task 128 (discussed below). However, when a first instance of one of exceptions 74 is determined at query task 126, i.e., severity level 78 is not six, process 40 proceeds to a query task 130.

At query task 130, notification engine 38 (FIG. 1) determines whether the severity of the one of exceptions 74 identified at query task 126 is increasing relative to a previous, corresponding exception 74 ascertained at a previous iteration of notification process 40. The implication at query task 130 is that although fault condition 76 (FIG. 5), i.e., a combination of fault type 80 and fault location 82, may not be changing, its seriousness in terms of severity level 78 is increasing.

When query task 130 determines that the seriousness of one of fault conditions 76 is increasing, i.e., a numerical value of severity level 78 is decreasing, notification process 40 proceeds to a task 132 (shown in FIG. 8B). At task 132, notice 60 (FIG. 4) specifying the one of exceptions 74 (i.e., combination of fault type 80, fault location 82, and severity level 78) is generated. However, when a determination is made that the first instance of one of exceptions 74 does not represent an increase in seriousness, i.e., a corresponding decrease in the numerical value of severity level 78, relative to a previous exception 74, notification process 40 proceeds to a query task 134.

At query task 134, notification engine 38 determines whether exception 74 includes a new one of fault types 80 (FIG. 5). This determination can be made by accessing exception database 46 (FIG. 6) to determine if a previous notice 60 specifying one of exceptions 74 was conveyed having the same fault type 80. When notification engine 38 determines at query task 138 that the one of exceptions 74 indicates a different fault type 80, i.e., a first instance of a new problem, notification process 40 again proceeds to task 132 to generate notice 60 specifying the one of exceptions 74 (combination of fault type 80, fault location 82, and severity level 78). However, when a determination is made that the first instance of one of exceptions 74 does not define a new one of fault types 80, notification process 40 proceeds to a query task 136.

At query task 136, notification engine 38 determines whether exception 74 includes a new one of fault locations 82 (FIG. 5). This determination can be made by accessing exception database 46 (FIG. 6) to determine if a previous notice 60 specifying one of exceptions 74 was conveyed having the same fault location 82. When notification engine 38 determines at query task 136 that the one of exceptions 74 indicates a different fault location 82, i.e., a first instance of a new problem, notification process 40 again proceeds to task 132 to generate notice 60 specifying the one of exceptions 74 (combination of fault type 80, fault location 82, and severity level 78). However, when a determination is made that the first instance of one of exceptions 74 does not define a new one of fault locations 82, notification process 40 proceeds to a task 138.

At task 138, a conclusion is reached that the one of exceptions 74 exhibits a decrease in seriousness (i.e., higher numerical value for severity level 78 than a previous, corresponding one of exceptions 74 ascertained at a previous iteration of notification process 40. Through the execution of tasks 126, 130, 134, and 136, elimination methodology is implemented to determine whether a first instance of a completely new exception 74 has been identified (fault type 80 and/or fault location 82), or one of fault conditions 76 (FIG. 5) remains unchanged from a previous sample, but the seriousness of a previously discovered exception 74 is increasing (i.e., numerical value of severity level 78 is getting smaller). If the one of exceptions 74 fails to exhibit those indicators, task 138 concludes that the one of exceptions 74 exhibits a decrease in seriousness (although it still remains at one of severity levels 78 at any of numerical values one through five).

At task 138, a deadband timer element (not shown) of processing system 30 (FIG. 1) is initiated. A deadband is an interval during which no action (notification) is to occur for the particular one of exceptions 74. Data elements 58 (FIG. 1) from DGA unit 28 (FIG. 1) typically follow the loading level of its associated one of transformers 26 (FIG. 1). Consequently, values 66 (FIG. 2) of gases 68 (FIG. 2) can rise and fall on a daily and seasonal basis. This data can trigger a new one of severity levels 78 and reset in response to subsequent data samples 58. In order to suppress notification on each change in severity level 78 when transformer 26 is in an essentially a static condition, the deadband is utilized. The deadband requires the severity level 78 to stay below particular thresholds for a specified period of time, before notification engine 38 will act upon the decreasing severity level 78.

Following initiation of the deadband timer, notification process 40 proceeds to a task 140 (shown in FIG. 8B). At task 140, notification engine 38 suppresses communication to any one of responsible parties 59 (FIG. 4) regarding a current status of the one of transformers 26 (FIG. 1). Following task 140, an iteration of notification process 40 is complete and process 40 exits. Of course, subsequent receipt and analysis of data elements 58 (FIG. 1) at analysis engine 34 (FIG. 1) of processing system 30 (FIG. 1) will result in additional iterations of notification process 40.

Returning to query task 126, a situation can arise in which the condition does not define a first instance of one of exceptions 74. These situations can include normal condition 72 (FIG. 2) of transformer 28 (all severity levels 78 having a numerical value of six); a subsequent instance of receipt of the one of exceptions 74 (severity level 78 is any of numerical values one through five and responsible party(ies) 59 have been previously notified); or a return from one of severity levels 78, exhibiting numerical value of one through five, back to severity level of six. Consequently, a negative response to query task 126 resulted in progression to query task 128.

At query task 128, a determination is made as to whether severity level 78 has returned to normal (i.e., severity level 78 is six) relative to a previous, corresponding one of exceptions 74. That is, query task 128 monitors for the situation in which there is a return from one of severity levels 78, one through five, back to severity level of six (normal) for a previously identified one of exceptions 74. When a determination is made at query task 128 that severity level 78 has returned to normal, notification process 40 proceeds to a query task 141.

At query task 141, a determination is made as to whether the deadband timer for this particular one of exceptions 74 was previously initiated. When the deadband timer has not already been initiated, process 40 proceeds to task 138 to initiate the deadband timer and subsequently complete this current iteration of process 40. Again, this deadband is imposed so as to prevent responsible party 59 from receiving nuisance notices 60 (FIG. 1) when the transformer condition is in transition between two different severity levels 78 and when daily load changes are likely to cause the gas levels to rise and fall.

However, when a determination is made at query task 141 that the deadband timer was previously initiated for this situation corresponding to a previous one of exceptions 74, notification process 40 proceeds to a query task 142 (shown in FIG. 8B).

At query task 142, notification engine 38 determines whether the deadband, i.e., the previously set timed interval, has expired. When notification engine 38 determines at query task 142 that the deadband is not expired, program control proceeds forward to task 140 to suppress communication to any one of responsible parties 59 and subsequently exit from the current iteration of notification process 40.

However, when notification engine 38 determines at query task 142 that the deadband is expired, process control proceeds to task 132 where notice 60 (FIG. 4) is generated to inform responsible party(ies) 59 of the reduction of severity.

Returning to query task 128, when query task 128 ascertains that the severity level 78 has not returned to normal (i.e., six) relative to a previous corresponding one of exceptions 74, either transformer 26 is operating nominally or the received one of exceptions 74 is a subsequent instance of receipt of the same one of exceptions 74. In either case, notification to responsible party(ies) is to be selectively suppressed so as to avoid repetitive and/or unnecessary notification. Consequently, program control proceeds to a query task 143 (shown in FIG. 8B).

At query task 143, a determination is made as to whether a subsequent instance of the same one of exceptions 74 has been received. When a determination is made that a subsequent instance of the same one of exceptions 74 has not been received, i.e., transformer 26 is operating nominally, notification process proceeds to task 140 where communication of normal condition 70 is suppressed and process 40 subsequently exits. However, when a determination is made at query task 143 that a subsequent instance of the same one of exceptions 74 has been received, notification process 40 proceeds to a query task 144.

At query task 144, a determination is made as to whether the deadband timer was previously initiated. That is, query task 144 determines whether a first instance of one of exceptions 74 caused the deadband timer to be initiated at task 138. When a determination is made that the deadband timer was not previously set, process 40 again proceeds to task 140 to suppress communication to responsible party(ies) 59 (FIG. 1) and exit from process 40. However, when a determination is made that the deadband timer was previously set, process 40 proceeds to query task 142 to determine whether the deadband is expired, thus allowing generation of notice 60 at task 132, or not expired, thus suppressing notification at task 140. Consequently, processing tasks 144 and 142 reveal either a) a subsequent instance of a previously identified one of exceptions 74, which exhibited increasing severity (query task 130), a new fault type (query task 134), and/or a new fault location (query task 136), or b) a subsequent instance of a previously identified one of exceptions 74 for which the severity has decreased and whether the deadband interval has expired.

The above-described operations generate notice 60 at task 132 upon a first instance of one of exceptions 74 or upon a decrease in seriousness of one of exceptions 74 following an appropriate deadband interval. In response to task 132, a task 145 is performed.

At task 145, notification engine 38 accesses contact list database (FIG. 5) to select one or more responsible parties 59 associated with the particular one of exceptions 74 detected. Following selection of one or more responsible parties 59 at task 145, program control proceeds to a task 146.

At task 146, notification engine 38 conveys one of notices 60 (FIG. 1) generated at task 132 to the selected one or more of responsible parties 59.

In response to task 146, a task 147 is performed. At task 147, notification engine 38 executes a notification monitor subprocess to monitor for acknowledgement 61 (FIG. 1) from the selected one of responsible parties 59 of receipt of notice 60 and to monitor for disposition 114 (FIG. 6) of exception 74. Following task 147, an iteration of notification process 40 is complete and process 40 exits. Of course, other abnormal conditions 72 characterizing exceptions 74 for other transformers 26 (FIG. 1), will result in additional iterations of notification process 40.

Notification process 40 is described in connection with the definition and identification of a first and/or subsequent instance of one of exceptions 74 for clarity of illustration. However, it should be understood that one of transformers 26 may be exhibiting multiple exceptions 74 during a single iteration of data analysis process 38 (FIG. 7). Alternatively, there may be another situation in which there is a decrease in severity for another previously identified one of exceptions 74. Consequently, the various processing steps of notification process 40 may be performed for each of the multiple exceptions 74 that may be present in the condition of transformer 26 (FIG. 1) resulting form data analysis process 36 (FIG. 7) and received at task 122. Repeated iteration of the above-described processing steps could result in notice 60 being updated at task 132 to reflect multiple fault conditions 76 (FIG. 4), each with their own associated severity level 78, an amalgamation of severity levels 78, or a single listing of the most serious of severity levels 78.

In addition, notification process 40 was described in a stepwise, explicit manner to convey understanding of the present invention. Those skilled in the art will recognize that there may be great variation in the operations of notification process 40 that would yield results common to those described above. Those common results are the notification of a first instance of an exception 74 (fault type/fault location/severity level) to the appropriate responsible party(ies), notification of a decreasing severity of one of exceptions 74 following an appropriate deadband interval, suppression of notification of subsequent instances of the same exception 74, and suppression of communication to the responsible parties when transformer 26 is operating nominally. Such selective notification greatly minimizes the amount of data that must be reviewed by humans.

Figure 9:
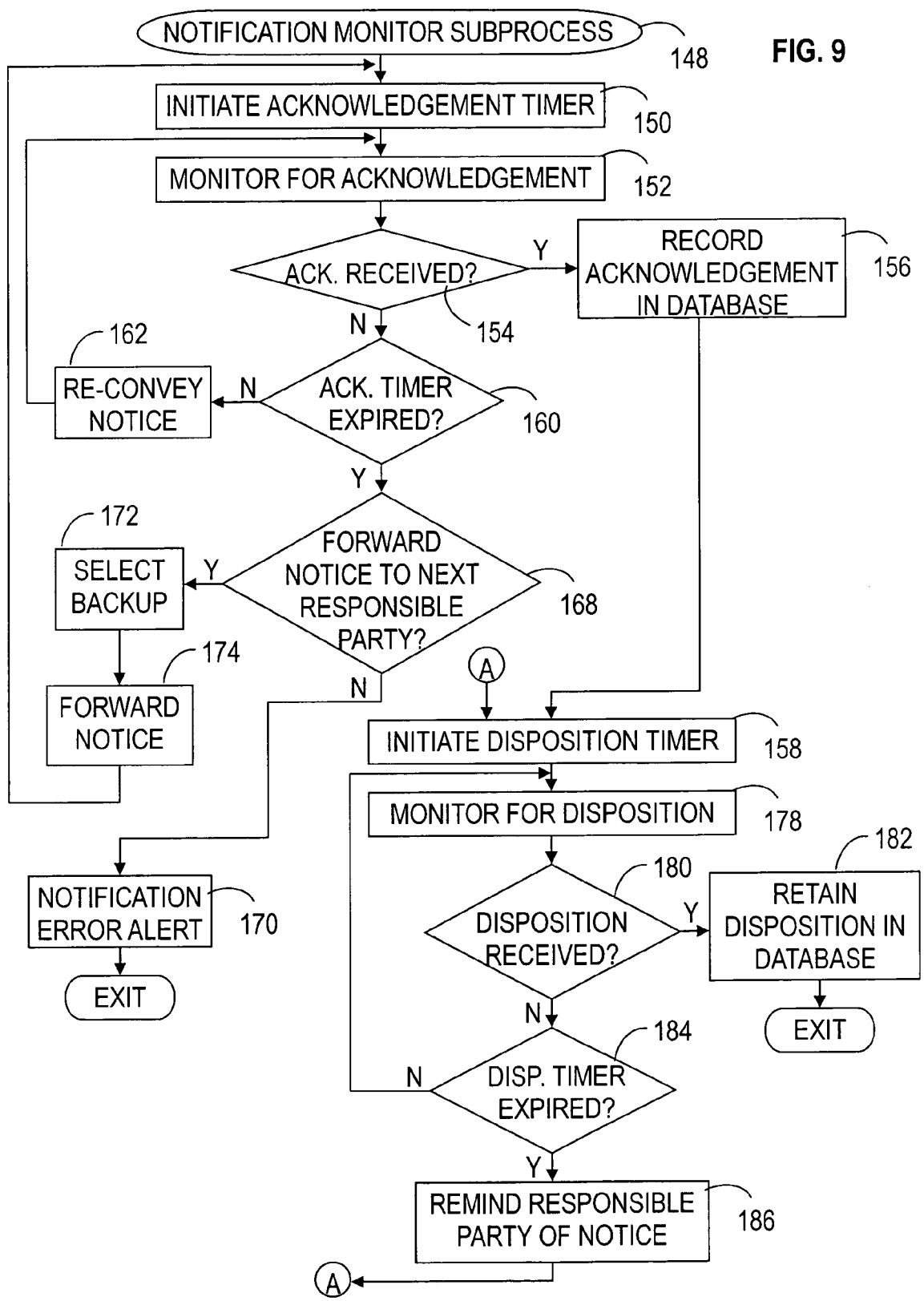
FIG. 9 shows a flowchart of a notification monitor subprocess of the notification process of FIGS. 8a-b.

FIG. 9 shows a flowchart of a notification monitor subprocess 148 of notification process 40 (FIGS. 8A-8B). Notification monitor subprocess 148 is performed in response to the conveyance of notice 60 (FIG. 1) to one of responsible parties 59 (FIG. 1). Attention should be directed to exception database 46 (FIG. 6) in connection with subprocess 148 in order to better understand the activities of notification monitor subprocess 148.

Subprocess 148 begins with a task 150. At task 150, notification engine 38 initiates acknowledgement timer 50 (FIG. 1). Acknowledgement timer 50 measures a window, or time period, during which a particular, predetermined responsible party 59 is to acknowledge receipt of notice 60. Acknowledgement timer 50 is started when notice 60 is conveyed to responsible party 59 at task 146 of notification process 40.

Following task 150, a task 152 is performed. At task 152, notification engine 38 monitors for acknowledgement 61 (FIG. 1) from the one of responsible parties 59 required to acknowledge notice 60 in accordance with facility 20 (FIG. 1) policies and procedures.

A query task 154 is performed in connection with task 152. At query task 154, notification engine 38 determines whether acknowledgement 61 is received. When acknowledgement 61 is received at query task 154, a task 156 is performed. However, when notification engine 38 ascertains at query task 154 that acknowledgement 61 has not been received, subprocess 148 proceeds to a query task 160.

At task 156, acknowledgement 61 is recorded in acknowledgement section 92 of exception database 46. As shown in database 46 (FIG. 6), a first notice 60 (NOTICE 1) of a first entry 188 (FIG. 6) reveals that acknowledgement 61 was received, exemplified by the character "Y" being placed in acknowledgement field 106. Following task 156, notification monitor subprocess 148 proceeds to a task 158 which is the first in a series of disposition activities, to be discussed below.

At query task 160 following a failure to receive acknowledgement 61, notification engine 38 determines whether acknowledgement timer 50 is expired. In other words, query task 160 ascertains whether the required interval for acknowledgement of receipt of notice 60 has expired. When acknowledgement timer 50 is not expired, program control proceeds to a task 162.

At task 162, notification engine 38 re-conveys notice 60 to the selected one of responsible parties 59. Subprocess 148 then loops back to task 152 to continue monitoring for acknowledgement 61. Task 162 may be executed periodically within the time interval measured by acknowledgement timer 50 to re-convey notice 60.

Referring to database 46 (FIG. 6) in connection with tasks 160 and 162, notice 60 (NOTICE 3), identified in a third entry 164, reveals that acknowledgement 61 was not received, exemplified by the character "N" being placed in acknowledgement field 106. Consequently, through the execution of task 162, notice 60 (NOTICE 3) is re-conveyed to the selected one of responsible parties 59, i.e. maintenance team 88, as represented by a fourth entry 166 in exception database 46.

When acknowledgement timer 50 is expired at query task 160, program control proceeds to a query task 168. At query task 168, notification engine 38 determines whether notice 60 is to be forwarded to the next one of responsible parties 59. When notice 60 is not to be forwarded at query task 168, task 170 may be performed. At task 170, a notification error alert may be posted. This notification error alert may be recorded in exception database 46 and/or may be sent to an control center administrator or lead for immediate correction. Following task 170, notification monitor subprocess 148 exits. However when a determination is made at query task 168 that notice 60 is to be forwarded, subprocess 148 proceeds to a task 172.

At task 172, notification engine 38 may select a next responsible party from contact list database 44 (FIG. 5). In this scenario, the next responsible party is the predetermined backup responsible party 90 (FIG. 5).

A task 174, performed in conjunction with task 172, causes notification engine 38 to forward notice 60 to the next one of responsible parties 59 selected at task 172, i.e., backup responsible party 90. Following task 174, program control loops back to task 150 to initiate acknowledgement timer 50 (FIG. 1) and monitor for acknowledgement 61 (FIG. 1).

The intent of the above-described notification activities is to ensure that an intended recipient, i.e. one of responsible parties 59, has actually received notice 60 of one of exceptions 74 (FIG. 5). Once acknowledgement 61 is received and recorded in exception database 46 (FIG. 6) at task 156, that responsible party 59 is now responsible for disposition of the particular exception 74. Accordingly, the notification activities of notification monitor subprocess 148 designates accountability for the particular exception 74 to responsible party 59 who must now take the appropriate action in accordance with procedures developed by electric utility facility 20 (FIG. 1).

As mentioned briefly above, disposition activities for a particular one of exceptions 74 (FIG. 5) are performed following recordation of acknowledgement 61 (FIG. 1) in acknowledgement section 92 (FIG. 6) of exception database 46 (FIG. 6) at task 156. Thus, following task 156, notification monitor subprocess 148 proceeds to task 158 which is the first in a series of disposition activities.

At task 158, notification engine 38 initiates disposition timer 52 (FIG. 1). Disposition timer 52 measures a window, or time period, during which notification engine 38 is to receive disposition 114 (FIG. 6) of the particular exception 74 from responsible party 59. Disposition timer 52 is started when acknowledgement 61 (FIG. 1) is received by notification engine 38 at task 156.

Following task 158, a task 178 is performed. At task 178, notification engine 38 monitors for receipt of disposition 114 (FIG. 6) from the one of responsible parties 59 to which notice 60 was conveyed and from which acknowledgement 61 was received.

A query task 180 is performed in connection with task 178. At query task 180, notification engine 38 determines whether disposition 114 is received. When disposition 114 is received at query task 180, a task 182 is performed. However, when notification engine 38 ascertains at query task 180 that disposition 114 has not been received, subprocess 148 proceeds to a query task 184.

At task 182, disposition 114 is recorded in disposition section 94 of exception database 46. As shown in database 46 (FIG. 6), a first entry 188 reveals that disposition 114 was recorded, exemplified by the phrase "CONTINUE NORMAL MONITORING" being placed in disposition field 113. Likewise, a fifth entry 190 reveals that disposition 114 was recorded, exemplified by the phrase "CONTINUE MONITORING, PERFORM MAINTENANCE AS SCHEDULED." Following task 182, notification monitor subprocess 148 exits for that particular notice 60.

At query task 184, after failing to receive disposition 114 at query task 180, notification engine 38 determines whether disposition timer 52 (FIG. 1) is expired. In other words, query task 184 ascertains whether the required interval for dispositioning the one of exceptions 74 recorded in exception database 46 (FIG. 6) has expired. When disposition timer 52 is not expired, program control loops back to task 178 to continue monitoring for disposition 114. However, when disposition timer 52 is expired, notification monitor subprocess 148 proceeds to a task 186.

At task 186 following expiration of disposition timer 52 (FIG. 1), notification engine 38 reminds the selected one or more responsible parties 59 of notice 60. Task 186 can be accomplished by re-conveying notice 60 to responsible party (ies) 59 or by conveying some other message identifying notice 60. A disposition error alert may be posted. This disposition error alert may be recorded in exception database 46 and/or may be sent to a control center administrator or lead for immediate correction. Following task 186, program control loops back to task 158 to restart disposition timer 52 and monitor for disposition 114 (FIG. 6).

Accordingly, the execution of notification process 40 (FIGS. 8A-8B) and notification monitor subprocess 148 (FIG. 9) ensures accountability for taking the appropriate actions in the event of abnormal conditions 72 (FIG. 3) occurring in monitored transformers 26 (FIG. 1) maintained within electric utility facility 20 (FIG. 1).

In summary, the present invention teaches of a method and system for selective notification of a condition of an apparatus. Selective notification is based on notifying the appropriate responsible party upon a first instance of an exception to an normal condition of the apparatus. The present invention provides notification to the appropriate responsible parties for multiple fault conditions and multiple severity levels of those fault conditions. However, unless the fault condition (fault type and fault location) or severity level changes, the notification engine does not send a notice so that redundant notification can be avoided. That is, although the notification engine is in an alert state, notification can be suppressed because the cognizant responsible parties are still aware of the alert condition. In addition, the present invention employs notification acknowledgement and fault condition disposition mechanisms for ensuring personnel accountability and resolution of problems. Accurate diagnostics and effective notification of fault conditions in transformers can yield significant savings in terms of the postponement of additional investment of replacement units, avoided costs due to unplanned outages (such as replacement energy, environmental cleanup, customer and collateral damage, and increased insurance).

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order then that which was presented. In addition, the number and levels of responsible parties, durations for the acknowledgement window, disposition window, and deadband can be varied in accordance with system complexity, severity of the exception, user preference, and the like.

What is claimed is:

1. A method for selective notification of a condition of an apparatus monitored by a monitoring device comprising:
   receiving data elements from said monitoring device;
   processing said data elements to detect said condition of said apparatus;
   determining that said condition defines an exception to a normal condition of said apparatus;
   conveying a first notice of said condition to a responsible party at a first instance of determination of said exception;

preventing conveyance of a second notice at a second instance of determination of said exception, said second instance occurring subsequent to said first instance;

receiving an acknowledgement of receipt of said first notice from said responsible party; and recording said acknowledgement in an acknowledgement database.

2. A method as claimed in claim 1 further comprising:

ascertaining that said condition is said normal condition of said apparatus; and preventing communication of said normal condition to said responsible party.

3. A method as claimed in claim 1 wherein said apparatus is one of a plurality of apparatuses, said monitoring device is one of a plurality of monitoring devices, and said method further comprises performing said receiving, processing, determining, conveying, and preventing operations for each of said plurality of apparatuses at a common processing system.

4. A method as claimed in claim 1 wherein said apparatus is a transformer maintained by a utility company, said monitoring device is a dissolved gas monitoring unit, said data elements are current values of dissolved gases in transformer oil, and said method further comprises performing said receiving, processing, determining, conveying, and preventing operations at a processing system of said utility company.

5. A method as claimed in claim 1 further comprising:

associating discrete responsible parties with a plurality of fault conditions possible at said apparatus; and determining from said exception one of said fault conditions such that said conveying operation selects said responsible party associated with said one fault condition from said discrete responsible parties.

6. A method as claimed in claim 5 wherein said determining operation includes identifying a fault type of said one fault condition such that said conveying operation selects said responsible party associated with said fault type.

7. A method as claimed in claim 5 wherein said determining operation includes identifying a fault location of said one fault condition such that said conveying operation selects said responsible party associated with said fault location.

8. A method as claimed in claim 1 wherein said data elements are first data elements, said exception is a first exception, and said method further comprises:

receiving second data elements from said monitoring device;

processing said second data elements to detect a second condition of said apparatus;

determining that said second condition is a second exception that differs from said first exception; and transferring a third notice of said second condition upon determination of said second exception.

9. A method as claimed in claim 8 wherein said transferring operation transfers said third notice to a second responsible party associated with a fault condition possible at said apparatus, said fault condition being defined by said second exception.

10. A method as claimed in claim 8 wherein said first exception defines a first severity level of a fault condition possible at said apparatus, said second exception defines a second severity level of said fault condition, and said method further comprises:

determining that said second severity level indicates a lesser seriousness of said fault condition than said first severity level; and delaying said transferring operation until said fault condition is detected at said second severity level for a predefined duration.

11. A method as claimed in claim 8 wherein said first exception defines a first severity level of a fault condition possible at said apparatus, said second exception defines a second severity level of said fault condition, and said transferring operation transfers said third notice to a second responsible party associated with said second severity level.

12. A method as claimed in claim 11 further comprising:

determining that said second severity level indicates a greater seriousness of said fault condition than said first severity level; and identifying said second responsible party as having greater authority than said responsible party in a predetermined chain of authority.

13. A method for selective notification of a condition of an apparatus monitored by a monitoring device comprising:

associating discrete responsible parties with severity levels for a fault condition possible at said apparatus;

receiving data elements from said monitoring device;

processing said data elements to detect said condition of said apparatus;

determining that said condition defines an exception to a normal condition of said apparatus;

determining from said exception one of said severity levels;

conveying a first notice of said condition to a responsible party at a first instance of determination of said exception, said conveying operation selecting said responsible party associated with said one severity level from said discrete responsible parties; and preventing conveyance of a second notice at a second instance of determination of said exception, said second instance occurring subsequent to said first instance.

14. A method for selective notification of a condition of an apparatus monitored by a monitoring device comprising:

receiving data elements from said monitoring device;

processing said data elements to detect said condition of said apparatus;

determining that said condition defines an exception to a normal condition of said apparatus;

conveying a first notice of said condition to a responsible party at a first instance of determination of said exception;

preventing conveyance of a second notice at a second instance of determination of said exception, said second instance occurring subsequent to said first instance;

ascertaining an absence of acknowledgement of receipt of said first notice from said responsible party; and periodically re-conveying said first notice in response to said ascertaining operation.

15. A method for selective notification of a condition of an apparatus monitored by a monitoring device comprising:

receiving data elements from said monitoring device;

processing said data elements to detect said condition of said apparatus;

determining that said condition defines an exception to a normal condition of said apparatus;

conveying a first notice of said condition to a responsible party at a first instance of determination of said exception;

preventing conveyance of a second notice at a second instance of determination of said exception, said second instance occurring subsequent to said first instance;

ascertaining an absence of acknowledgement of receipt of said first notice from said responsible party; and forwarding said first notice to a second responsible party in response to said ascertaining operation.

16. A method as claimed in claim 15 further comprising performing said forwarding operation following expiration of an acknowledgement window, said acknowledgement window providing an interval during which said responsible party is to acknowledge said first notice.

17. A method for selective notification of a condition of an apparatus monitored by a monitoring device comprising:
receiving data elements from said monitoring device;
processing said data elements to detect said condition of said apparatus;
determining that said condition defines an exception to a normal condition of said apparatus;
conveying a first notice of said condition to a responsible party at a first instance of determination of said exception;
preventing conveyance of a second notice at a second instance of determination of said exception, said second instance occurring subsequent to said first instance;
receiving a disposition of said exception from said responsible party; and
retaining said disposition in a disposition database.

18. A method for selective notification of a condition of an apparatus monitored by a monitoring device comprising:
receiving data elements from said monitoring device;
processing said data elements to detect said condition of said apparatus;
determining that said condition defines an exception to a normal condition of said apparatus;
conveying a first notice of said condition to a responsible party at a first instance of determination of said exception;
preventing conveyance of a second notice at a second instance of determination of said exception, said second instance occurring subsequent to said first instance;
failing to receive a disposition of said exception from said responsible party; and
reminding said responsible party of said first notice.

19. A system for selective notification of a condition of each of a plurality of apparatuses, said each of said apparatuses being monitored by one of a plurality of monitoring devices, and said system comprising:
an analyzer configured for communication with each of said plurality of monitoring devices such that for said each of said monitoring devices, said analyzer receives data elements from said each monitoring device, processes said data elements to detect said condition of an associated one of said apparatuses, and determines that said condition defines one of a normal condition and an exception to said normal condition;
a notification engine in communication with said analyzer, said notification engine conveying a first notice of said condition to a responsible party at a first instance of determination of said exception, said notification engine preventing conveyance of a second notice of said condition at a second instance of determination of said exception, said second instance occurring subsequent to said first instance, and said notification engine preventing communication with said responsible party upon determination of said normal condition; and
a contact list database in communication with said notification engine for association of discrete responsible parties with fault conditions possible at said apparatuses, said exception defines one of said fault conditions, and said notification engine selects said responsible party associated with said one fault condition from said discrete responsible parties, said contact list database establishing a chain of authority of said discrete responsible parties for a plurality of severity levels of said one fault condition, said exception defines one of said severity levels, and said notification engine selects said responsible party associated with said one of said severity levels.

20. A system for selective notification of a condition of each of a plurality of apparatuses, said each of said apparatuses being monitored by one of a plurality of monitoring devices, and said system comprising:
an analyzer configured for communication with each of said plurality of monitoring devices such that for said each of said monitoring devices, said analyzer receives data elements from said each monitoring device, processes said data elements to detect said condition of an associated one of said apparatuses, and determines that said condition defines one of a normal condition and an exception to said normal condition;
a notification engine in communication with said analyzer, said notification engine conveying a first notice of said condition to a responsible party at a first instance of determination of said exception, said notification engine preventing conveyance of a second notice of said condition at a second instance of determination of said exception, said second instance occurring subsequent to said first instance, and said notification engine preventing communication with said responsible party upon determination of said normal condition; and
an acknowledgement database in communication with said notification engine for recording an acknowledgement from said responsible party of receipt of said first notice.

21. A system for selective notification of a condition of each of a plurality of apparatuses, said each of said apparatuses being monitored by one of a plurality of monitoring devices, and said system comprising:
an analyzer configured for communication with each of said plurality of monitoring devices such that for said each of said monitoring devices, said analyzer receives data elements from said each monitoring device, processes said data elements to detect said condition of an associated one of said apparatuses, and determines that said condition defines one of a normal condition and an exception to said normal condition; and
a notification engine in communication with said analyzer, said notification engine conveying a first notice of said condition to a responsible party at a first instance of determination of said exception, said notification engine preventing conveyance of a second notice of said condition at a second instance of determination of said exception, said second instance occurring subsequent to said first instance, and said notification engine preventing communication with said responsible party upon determination of said normal condition; and
a disposition database in communication with said notification engine for retaining a disposition of said exception from said responsible party.

22. A method for selective notification of a condition of an apparatus monitored by a monitoring device comprising:
receiving data elements from said monitoring device;
processing said data elements to detect said condition of said apparatus;
determining that said condition defines an exception to a normal condition of said apparatus;
conveying a first notice of said condition to a responsible party at a first instance of determination of said exception;

preventing conveyance of a second notice at a second instance of determination of said exception, said second instance occurring subsequent to said first instance;

discovering one of an acknowledgement and an absence of said acknowledgement from said responsible party of receipt of said first notice;

upon discovery of said acknowledgement, recording said acknowledgement in a notification database; and upon said absence of said acknowledgment, periodically re-conveying said first notice to said responsible party.

23. A method as claimed in claim 22 further comprising:

ascertaining that said condition is said normal condition of said apparatus; and preventing communication of said normal condition to said responsible party.

24. A method as claimed in claim 22 wherein said data elements are first data elements, said exception is a first exception, and said method further comprises:

receiving second data elements from said monitoring device;

processing said second data elements to detect a second condition of said apparatus;

determining that said second condition is a second exception that differs from said first exception; and transferring a third notice of said second condition upon determination of said second exception.

25. A method as claimed in claim 22 further comprising forwarding, upon said absence of said acknowledgement, said first notice to a second responsible party following expiration of an acknowledgement window, said acknowledgement window providing an interval during which said responsible party is to acknowledge said first notice.

26. A method as claimed in claim 22 further comprising discerning one of receipt of a disposition of said exception from said responsible party and a failure to receive said disposition;

upon receipt of said disposition, retaining said disposition in a notification database; and upon said failure to receive said disposition, reminding said responsible party of said first notice.

\* \* \* \* \*